US008239448B2

(12) United States Patent
Lo et al.

(10) Patent No.: US 8,239,448 B2
(45) Date of Patent: Aug. 7, 2012

(54) SYSTEM AND METHOD FOR PROVIDING NETWORK CONNECTIVITY AND COMPUTER STATUS INFORMATION

(75) Inventors: Trenton S. Lo, Greenwood, MO (US); Christopher M. Morris, Olathe, KS (US)

(73) Assignee: CenturyLink Intellectual Property LLC, Denver, CO (US)

( * ) Notice: Subject to any disclaimer, the term of this patent is extended or adjusted under 35 U.S.C. 154(b) by 430 days.

(21) Appl. No.: 11/590,066

(22) Filed: Oct. 31, 2006

(65) Prior Publication Data

US 2008/0104165 A1    May 1, 2008

(51) Int. Cl.
*G06F 15/16* (2006.01)
(52) U.S. Cl. ........................................ 709/203; 709/220
(58) Field of Classification Search ........................ None
See application file for complete search history.

(56) References Cited

U.S. PATENT DOCUMENTS

| | | | | |
|---|---|---|---|---|
| 5,764,235 A * | 6/1998 | Hunt et al. | .................... | 345/428 |
| 6,167,441 A * | 12/2000 | Himmel | ........................ | 709/217 |
| 6,289,378 B1 * | 9/2001 | Meyer et al. | .................. | 709/223 |
| 6,389,426 B1 * | 5/2002 | Turnbull et al. | ............. | 707/102 |
| 6,931,357 B2 * | 8/2005 | Richard et al. | ................ | 702/188 |
| 7,519,691 B2 * | 4/2009 | Nichols et al. | ................ | 709/220 |
| 7,603,440 B1 * | 10/2009 | Grabowski et al. | ........... | 709/220 |
| 2002/0174185 A1 * | 11/2002 | Rawat et al. | ................... | 709/206 |
| 2004/0049394 A1 * | 3/2004 | Burger et al. | ..................... | 705/1 |
| 2004/0093594 A1 * | 5/2004 | Kapadia et al. | ............... | 717/170 |
| 2005/0144261 A1 * | 6/2005 | Nichols et al. | ................ | 709/220 |
| 2005/0160162 A1 * | 7/2005 | Cromer et al. | ................ | 709/223 |
| 2006/0229054 A1 * | 10/2006 | Erola et al. | .................... | 455/403 |
| 2006/0282704 A1 * | 12/2006 | Morgan et al. | .................. | 714/26 |
| 2007/0155421 A1 * | 7/2007 | Alberth et al. | ............. | 455/553.1 |
| 2007/0168725 A1 * | 7/2007 | Lee | ................................ | 714/23 |
| 2007/0208837 A1 * | 9/2007 | Tian et al. | ..................... | 709/223 |
| 2008/0049779 A1 * | 2/2008 | Hopmann et al. | ............ | 370/431 |

* cited by examiner

*Primary Examiner* — Ario Etienne
*Assistant Examiner* — Clayton R Williams
(74) *Attorney, Agent, or Firm* — Swanson & Bratschun, L.L.C.

(57) ABSTRACT

The present system and method for providing network connectivity and computer status information is displayed to a user and presents useful troubleshooting information related to various networks and computer status information. The present system includes means for determining at least one of the group consisting of a computer's IP address, host name, computer model, and user ID of said user's computer, means for determining a telephone number to a help desk associated with the user's computer, and means for displaying the telephone number and the at least one of the group consisting of a computer's IP address, host name, computer model, and user ID of the user's computer to the user.

27 Claims, 8 Drawing Sheets

SYSTEM AND METHOD FOR PROVIDING NETWORK CONNECTIVITY AND COMPUTER STATUS INFORMATION

FIELD OF THE INVENTION

The present invention relates generally to network connectivity, and more particularly to a system and method for providing network connectivity and computer status information.

PROBLEM

Computer networks provide enormous power and ability to computer users by providing a means for computers to communicate with each other around the world. This connectivity allows the computers and their users to share all types of information and data in substantially real-time. Soon after these networks came into existence, companies and network providers began providing limited troubleshooting services to their employees, users, and customers to assist them with connectivity problems between their computer and a particular network. This information is typically provided to their users as a courtesy to keep them updated on ongoing efforts to fix the connectivity issues and to possibly assist them with fixing the issues in the hope of minimizing user frustration caused by unknown connectivity problems. Typically, users access these connectivity troubleshooting services by calling a toll-free number of a network provider where they speak to a technical service representative or hear a recorded message of instructions regarding potential network problems, proposed solutions related to fixing their problems, or both. These toll-free numbers to help desks are typically provided to the users in statements and emails sent to the users.

Oftentimes, companies change contact information, such as toll-free numbers and the like, to critical help desk functions because of relocations, mergers, spin-offs, upgrading, and the like. They attempt to notify their affected users by sending them notices of the change via standard mail, email, or other means. Nevertheless, more often than not users do not read these notices, and thus ultimately attempt to contact a help desk using outdated contact information. This causes additional headaches and delays for users attempting to contact a particular help desk.

In addition, a substantial burden is placed on manpower resources of a network provider to provide technical service representatives to answer all of these calls from users, especially when little to no information about the user's computer is available at the beginning of the call. Typically, the technical service representative of the network provider must ascertain some preliminary information about the user's computer, such as IP address, user ID, and the like, to begin the process of troubleshooting network connectivity problems. The troubleshooting process slows further when a user is unable to provide this preliminary information to the technical service representative at the outset of the call. Additional time is spent instructing a user how to find the preliminary information, many times directing them to DOS screens and commands to locate this information prior to the representative being able to begin the troubleshooting process.

SOLUTION

The above-described problems are solved and a technical advance achieved by the present system and method for providing network connectivity and computer status information. The present system provides a readily accessible icon located on a user's computer screen that when selected provides on the display of the computer relevant information relating to the computer and any connectivity issues that may affect the computer.

The present system displays critical information related to a user's computer and also displays network connectivity information to a user's display. This displayed information can then be quickly conveyed to a technical service representative to enable them to "remote" to the user's computer for further troubleshooting operations. The present system further displays to the user the host name of the user's computer, the user's type of computer, and login ID for easy communication to a representative.

Additionally, the present system provides a display of the known network connectivity issues so that a user can instantly see if their network is affected. This display will also provide current outages not specific to network connectivity. Messages related to each displayed issue may also be displayed to a user to inform them of when the problem is expected to be corrected. Also, these issues may be presented as hyperlinks to the user, such that when selected or "clicked" additional information is presented regarding that selected connectivity issue. The present system also provides easy to use tools for the user to initially troubleshoot a connectivity problem between their computer and a particular network. These tools are presented to the user in easy to use drop down menus that contain additional information related to troubleshooting the connectivity issue. Thus, the present system substantially reduces the number of communications, such as phone calls, to the technical service department because users are better able to understand the present status of their network connection. Further, calls are reduced due to those users that are able to troubleshoot their connectivity issues themselves. Moreover, those users who still call the technical service department are better informed regarding the status of their network and computer, and thus the troubleshooting process between the user and the technical service representative is significantly expedited.

SUMMARY

The present system and method for providing network connectivity and computer status information is displayed to a user and presents useful troubleshooting information related to various networks and computer status information. The present system includes means for determining at least one of the group consisting of a computer's IP address, host name, computer model, and user ID of said user's computer, means for determining a telephone number to a help desk associated with the user's computer, and means for displaying the telephone number and the at least one of the group consisting of a computer's IP address, host name, computer model, and user ID of the user's computer to the user.

DETAILED DESCRIPTION OF THE DRAWINGS

Figure 1:
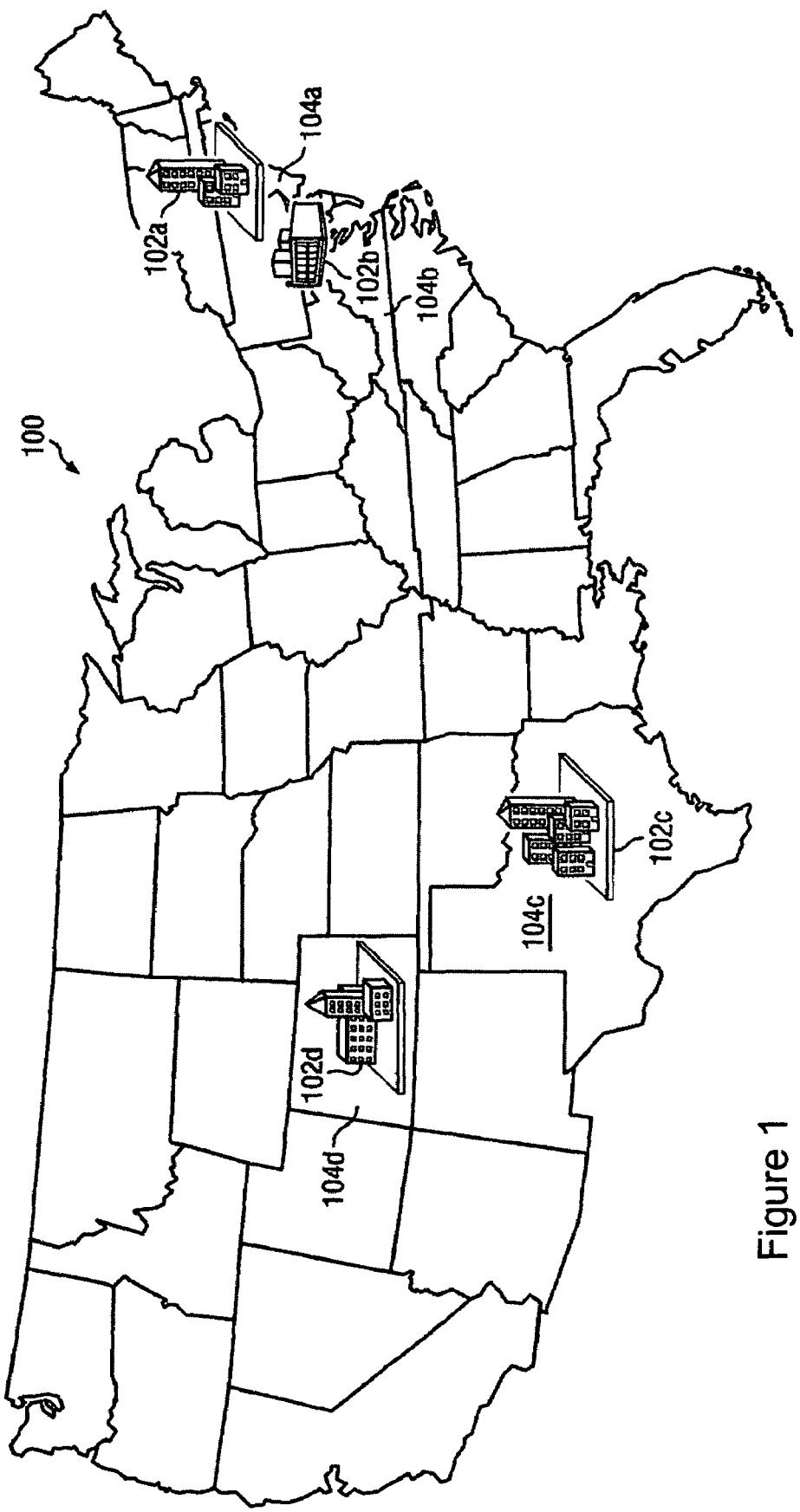
FIG. 1 illustrates a map of an exemplary company having multiple offices, each in a different state, according to an embodiment of the present invention.

Like reference numerals are used to indicate like parts throughout the drawings. FIG. 1 is a map 100 that includes an exemplary entity, such as a company, having multiple offices 102a-102b (collectively 102), each in a different state 104a-104d (collectively 104). The company may be headquartered in the office 102a located in Washington, D.C., while satellite offices of the company may be located in different states, such as Virginia, Texas, and Colorado, as shown. The main office 102a typically includes employees, engineers, salespeople, and the like that operate the company. The company may further include a CEO, management committee, human resources administration, marketing administration, and other administration functions. The company typically also includes a staff of technical service representatives and engineers whose responsibility is to provide technical support to the company by assisting its employees with technical issues, including computer and network related problems.

Figure 2:
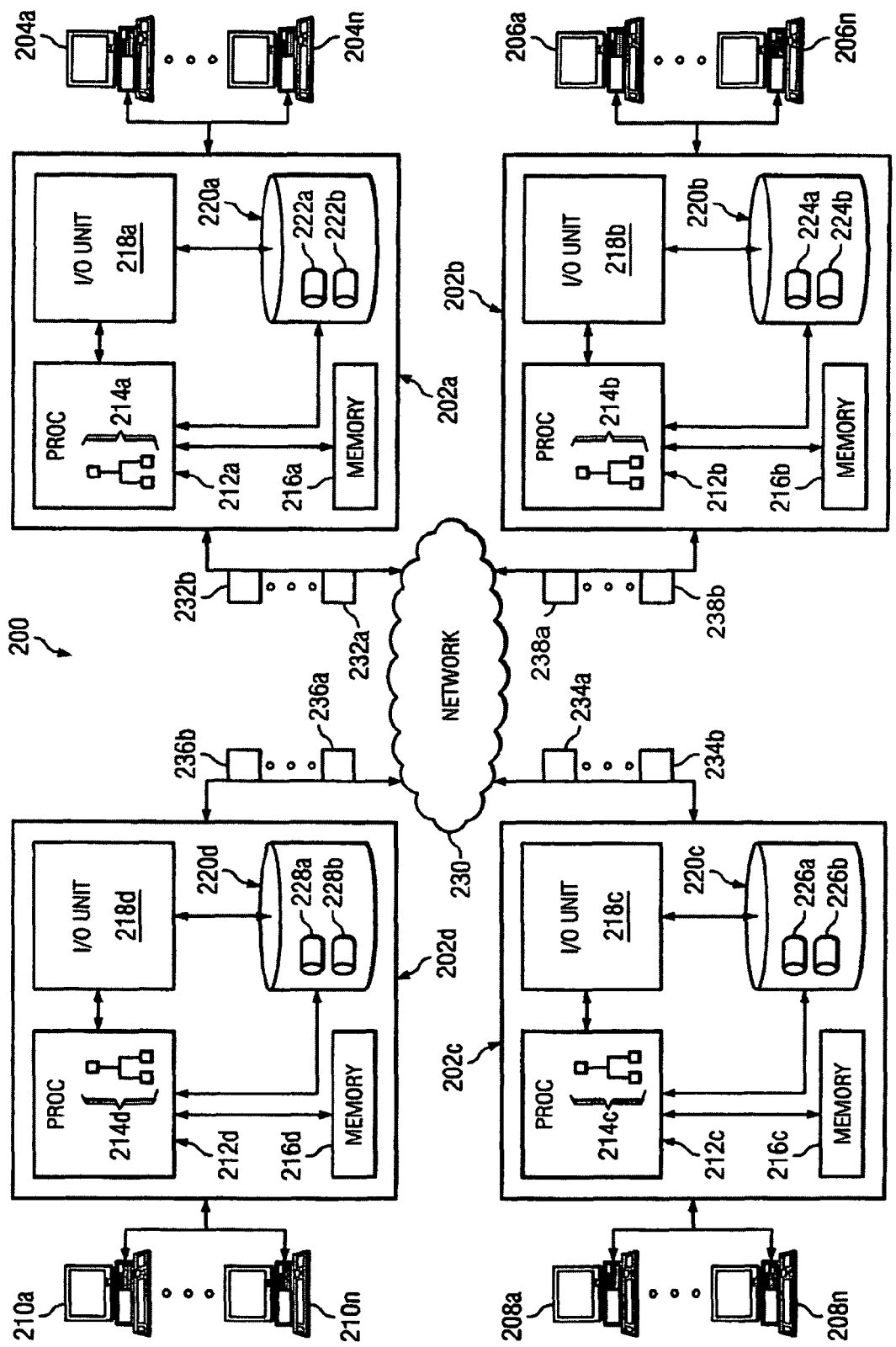
FIG. 2 illustrates a block diagram of an exemplary network of computers in a system for providing network connectivity and computer status according to an embodiment of the present invention.

FIG. 2 is a block diagram of an exemplary network of computers 200 utilized by a company having multiple offices, such as that shown in FIG. 1. Each company office may utilize a server 202a, 202b, 202c, and 202d (collectively 202), respectively. The servers 202 may host personal computers 204a-204n, 206a-206n, 208a-208n, and 210a-210n, respectively, utilized by the company's employees throughout these offices.

The server 202a may include a processor 212a that executes software 214a. The processor 212a may be in communication with memory 216a, an input/output (I/O) unit 218a, and a storage unit 220a. The storage unit 220a may store databases or data repositories 222a-222b thereon. The software 214a may include instructions for execution by the processor 212a for providing network connectivity and computer status information in accordance with the principles of the present invention. In one embodiment, the software 214a is composed of a network connectivity and computer status software program further described in FIGS. 3-9. The server 202a may be physically located or utilized by the main office of the company.

A satellite office may utilize the server 202b. The server 202b may include a processor 212b that executes software 214b. The processor 212b may be in communication with memory 216b, I/O unit 218b, and storage unit 220b. The storage unit may store databases 224a-224b for storing information associated with the computers and networks in the satellite office. Each of the other satellite offices may utilize the servers 202c and 202d, which may include the same or similar internal components as those of servers 202a and 202b, which are shown, accordingly. Each of the servers 202 may communicate via a network 230. The network 230 may be the Internet, intranet, WANs, LANs, or other communication systems capable of communicating information between computing devices. The server 202a may communicate data packets 232a-232b containing information related to any of the computer and networks of the company to another server 202b through data packets 238a-238b, as understood in the art. Similarly, the servers 202c and 202d may communicate information to the server 202a via data packets 234a-234b and 236a-236b, respectively, via the network 230. In addition, network 230 may be a communications network, a computer network, a combination of them, and the like.

In operation, the server 202a may execute the software 214a to enable the employees at the company to utilize their personal computers 204a and 208a, for example, either directly with the server 202a or indirectly via the network 230. The personal computers enable the employees of the company to interface with the software 214a to display computer status information and troubleshoot network connectivity problems. Personal computers 204a-204n, 206a-206n, 208a-208n, and 210a-210n may also include other peripherals, such as keyboards, displays, microphones, and the like.

One feature of software 214a-214d is that it determines and displays to a user's computer display their computer's IP address, host name of computer, type of computer information, and user ID. Additionally, another feature of the software 214a-214d is that it displays to a user network connectivity information for understanding the current status of a particular network. The software 214a-214d further provides tools for a user to troubleshoot their own connection before or during a conversation with a technical service provider at the company. It also displays to a user a useful links page that contains quick links to many useful computer and network applications.

In one embodiment, the present system uses a "push" method for distributing the software 214a-214d to a user's computer. In this embodiment, the software 214a-214d is pushed to users via email or intranet portal as further described below. The present system schedules the distribution of emails to target employees or users for distributing the software 214a-214d to a user's computer 204a-204n, 206a-206n, 208a-208n, and 210a-210n. In another embodiment, the present system uses a "push" method for distributing the software 214a-214d to a user's computer 204a-204n, 206a-206n, 208a-208n, and 210a-210n. As such, users may access the present system by selecting an icon in a toolbar that is displayed on the user's computer 204a-204n, 206a-206n, 208a-208n, and 210a-210n.

Figure 3:
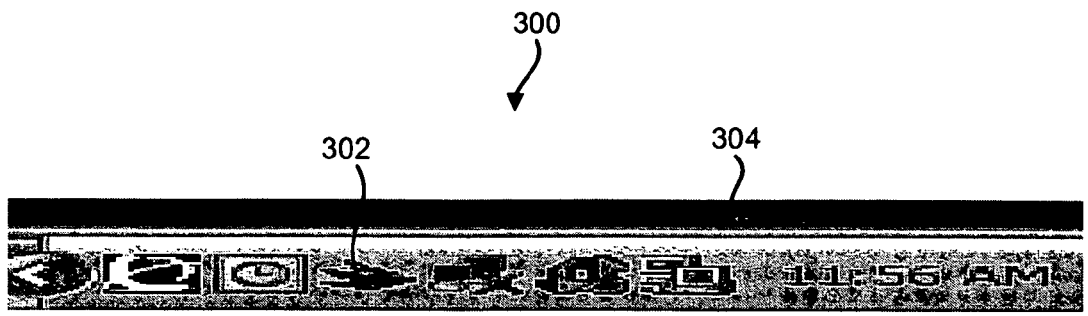
FIG. 3 illustrates an exemplary screenshot of a user interface of the present system showing a network connectivity icon in a toolbar according to an embodiment of the present invention.
Figure 4:
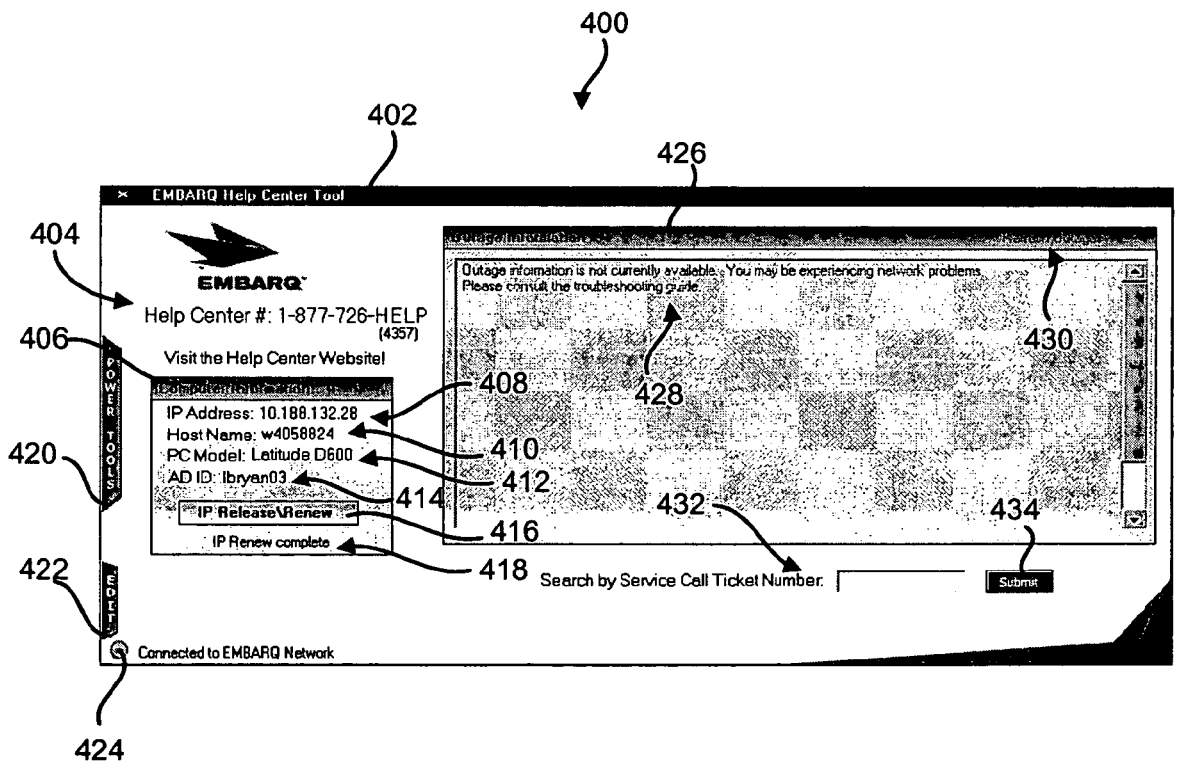
FIG. 4 illustrates an exemplary screenshot of a user interface of the present system showing a main page according to an embodiment of the present invention.

FIG. 3 illustrates an exemplary screenshot of an embodiment 300 of a user interface of the present system showing a network connectivity icon 302 that is displayed in a toolbar 304 of the present invention. FIG. 4 illustrates an exemplary screenshot of an embodiment 400 of a user interface of the present system showing a main page of control panel 402. The control panel 402 is displayed after a user selects the network connectivity icon 302 on their toolbar 304. In another aspect, the control panel 402 may be displayed after a user selects another means for initiating the display of the control panel 402, such as clicking on an icon located on their desktop of the user interface or selecting the program to run from a menu located on the user's computer 204a-204n, 206a-206n, 208a-208n, and 210a-210n or network.

In the upper left-hand corner of the control panel 402 is a help center telephone number 404 that may be called by a user that is experiencing network connectivity problems. In the left-hand portion of the control panel 402 is a computer information window 406 that displays a user's computer's IP address 408, host name 410, PC model 412, user ID 414, IP release/renew button 416, and IP release status 418. In addition, located further on the left side of the control panel 402 includes a power tools menu 420, an edit menu 422, and a connection status indicator 424. Located on the right side of the control panel 402 is an outage information window 426 that displays outage service call 428 regarding the networks available to a user's computer 204a-204n, 206a-206n, 208a-208n, and 210a-210n. The outage information window 426 also includes a refresh outages button 430. The control panel 402 further includes a search ticket number box 432 and a submit button 434.

Help center telephone number 404 is displayed to a user to provide them with a telephone number to call that will reach a help desk person or automated call center that supports network connectivity issues and problems. The help center telephone number 404 may be different for different users. In one aspect, the help center telephone number 404 can be changed in the user's computer 204a-204n, 206a-206n, 208a-208n, and 210a-210n registry key during the installation of the software 214a-214d on the user's computer 204a-204n, 206a-206n, 208a-208n, and 210a-210n. The help center telephone number 404 may further be assigned to a particular user based on their status or position within the company. For example, all executives may call one help center telephone number 404 and their employees may call another help center telephone number 404. The present invention provides for the company to quickly change these help center telephone numbers 404 in response to an emergency, the change to the help center telephone number 404 would then be "pushed" or otherwise delivered to the user's computer computer's 204a-204n, 206a-206n, 208a-208n, and 210a-210n for use during the emergency. In another aspect, the help center telephone number 404 may be automatically pushed to users if the system is about to experience an emergency shutdown or other catastrophic event that would affect the network.

The displayed computer's IP address 408 assists a user in identifying their computer's IP address when they are in contact with the company's help desk. It enables a company's technical service provider to remote to the user's computer 204a-204n, 206a-206n, 208a-208n, and 210a-210n. Additionally, the host name 410, PC model 412, user ID 414 also provide information to the help desk for troubleshooting user's computer's 204a-204n, 206a-206n, 208a-208n, and 210a-210n network connectivity problems. When the control panel 402 is displayed on the screen, inside of the computer information window 406 the IP address 408 is automatically obtained and displayed.

The host name 410 is the unique name of the of the user's computer 204a-204n, 206a-206n, 208a-208n, and 210a-210n. Additionally, the PC model 412 is the model information of the user's computer 204a-204n, 206a-206n, 208a-208n, and 210a-210n. The user ID 414 is the identification number of the user. The host name 410 and the PC model 412 are obtained by the tool from the Computer Management Properties window. The user ID 414 is obtained by the tool from the Operating System Properties. The control panel 402 displays the user ID as the current logged on user.

The IP release/renew button 416 provides the user with a tool to release and renew the IP address of the user's computer 204a-204n, 206a-206n, 208a-208n, and 210a-210n. This may be used by the user to troubleshoot their network connectivity problems by providing them with a quick way to see if they are getting a new IP address. For example, if a user's computer 204a-204n, 206a-206n, 208a-208n, and 210a-210n were connected to the company's network in a particular building or office and then relocated to another building or office, their IP address may be from their first connection, which then wouldn't work at their new connection. By selecting the IP release/renew button 416 the IP address is released and renewed by the user without having to contact a technical support representative. Selecting the IP release/renew button 416 purges the old IP address and renews to the current IP address that corresponds to the new building or office that they are currently in.

The IP release status 418 will display the latest status of any IP release/renew operations that have been performed by the user. Thus, as shown in FIG. 4, the system has recently renewed the IP address for a particular user's computer 204a-204n, 206a-206n, 208a-208n, and 210a-210n.

The connection status indicator 424 is used to provide indicia to the user that their computer 204a-204n, 206a-206n, 208a-208n, and 210a-210n are connected to a network. In one embodiment, if the connection status indicator 424 is green, then the user's computer 204a-204n, 206a-206n, 208a-208n, and 210a-210n is connected to a particular network of the company. If the connection status indicator 424 is red, then the user's computer 204a-204n, 206a-206n, 208a-208n, and 210a-210n IP address has not been obtained, and thus is not connected to a particular network. If the connection status indicator 424 is blue, then the user's computer 204a-204n, 206a-206n, 208a-208n, and 210a-210n is connected to a network, but not one of the company's network. The software 214a-214d determines whether the IP address of the network begins with a certain set of digits or numbers and then if it recognizes it belonging to the company, it displays a green connection status indicator 424. If determines an IP address that is not associated with the company's network, then it displays a blue connection status indicator 424. If it determines that no IP address is available, then it displays a red connection status indicator 424. This is beneficial to a user for quickly determining whether or not they have a network connection and whether it is the company's or not. Thus, if a user connects to their computer 204a-204n, 206a-206n, 208a-208n, and 210a-210n to a jack in their office and the connection status indicator 424 displays is red, then the user will select the IP release/renew button 416 to renew the IP address. If a red connection status indicator 424 is still displayed, then the user will recognize that their network connection in their office is down and then they may contact the help center telephone number 404.

The outage information window 426 displays known outage service call 428, such as outages and issues that exist within a company. This information may automatically re-populate at a predetermined period of time, such as every five minutes, to display to a user all known network issues and outages. In addition, each individual outage service call 428 may be hyperlink or link that when selected by a user displays additional information relating to that particular outage service call 428. For example, if a user's email wasn't working, then a user could scan the outage service call 428 for information relating to their particular email server being down. Then they could select or click on that outage service call 428 and be further informed about the issues affecting that particular email server and when it might possibly be back up.

Figure 5:
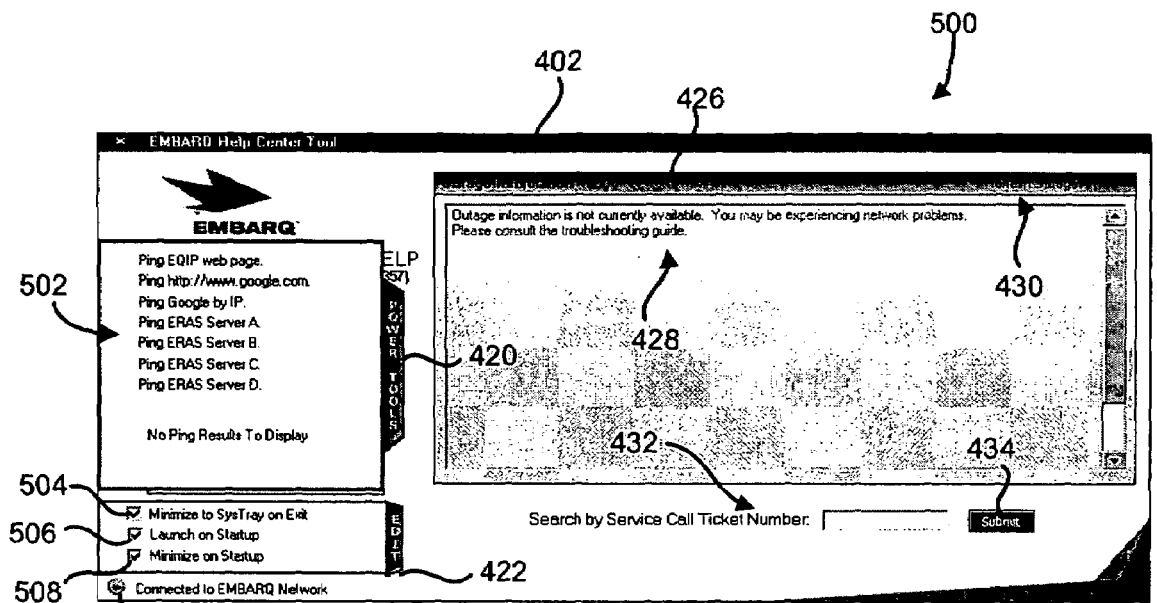
FIG. 5 illustrates an exemplary screenshot of a user interface of the present system showing a tools window according to an embodiment of the present invention.

FIG. 5 illustrates an exemplary screenshot of an embodiment 500 of a user interface of the present system showing another outage information window 426 of the present invention. When a user selects the power tools menu 420 (FIG. 4) a list of networks 502 that are available to a user are displayed. The list of networks 502 are links that are individually "pinged" when a user selects or "clicks" one of the list of networks 502. For example, if a user selects the "Ping EQIP webpage" link then the system will ping the EQIP server to determine if the user's computer 204a-204n, 206a-206n, 208a-208n, and 210a-210n is connected to it and the results are displayed at the lower edge of the list of networks 502. When one computer pings another computer or website, the initiating computer sends a request packet to the receiving computer or website. The initiating computer then waits for a response from the receiving computer to verify that a network connection exists. Once the connection is successfully or unsuccessfully recognized, the results are displayed at the lower edge of the list of networks 502.

To decrease the amount of memory used for part of the system, some options are available to a user to determine how the system minimizes and runs. For example, if a user desires to have the system minimized as an icon 302 that is displayed in their toolbar 304 when the system is started up, then they would select the minimize on startup 508 button. If the user desires to see the control panel 402 when the system is started up, then they would select the launch on startup 506 button. Additionally, if a user desires for the system to minimize to the system tray upon exit, then they would select the Minimize to SysTray on Exit 504 button. In order for a user to change how the tool opens to them, they must click on edit 422 in the lower left corner. Once the edit options are shown they can choose between three different options which are Minimize to SysTray on Exit 504, Launch on Startup 506 and Minimize on Startup 508.

Figure 6:
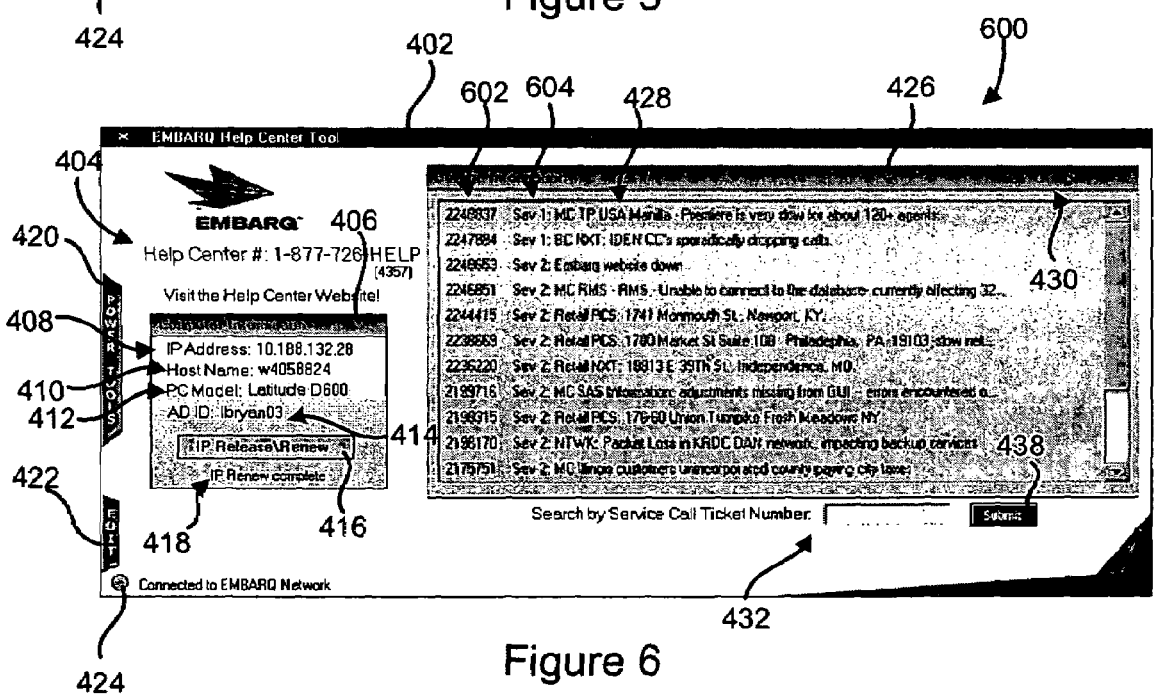
FIG. 6 illustrates an exemplary screenshot of a user interface of the present system showing a network outage window according to an embodiment of the present invention.

FIG. 6 illustrates an exemplary screenshot of an embodiment 600 of a user interface of the present system showing another outage information window 426 of the present invention. In this embodiment, each outage service call 428 may include a corresponding service ticket number 602 for the convenience of the user and technical service representative. The service ticket number 602 may also be entered into the search ticket number box 432 to receive the latest update about a particular outage service call 428. After the search ticket number box 432 has been entered into the search ticket number box 432, then the submit button 438 is selected and the latest update about a particular outage service call 428 is displayed to the user. Additionally, the outage information window 426 may also include severity ratings 604 that correspond to the degree of severity of the outage. For example, the lower the number of the severity ratings 604 the higher the severity of the outage. The refresh outages button 430 may be selected to refresh the outage service call 428 for a user. When a user selects the refresh outages button 430, a connection is established with the official outage website and the most current information is loaded into the control panel 402 for the user to view.

Figure 7:
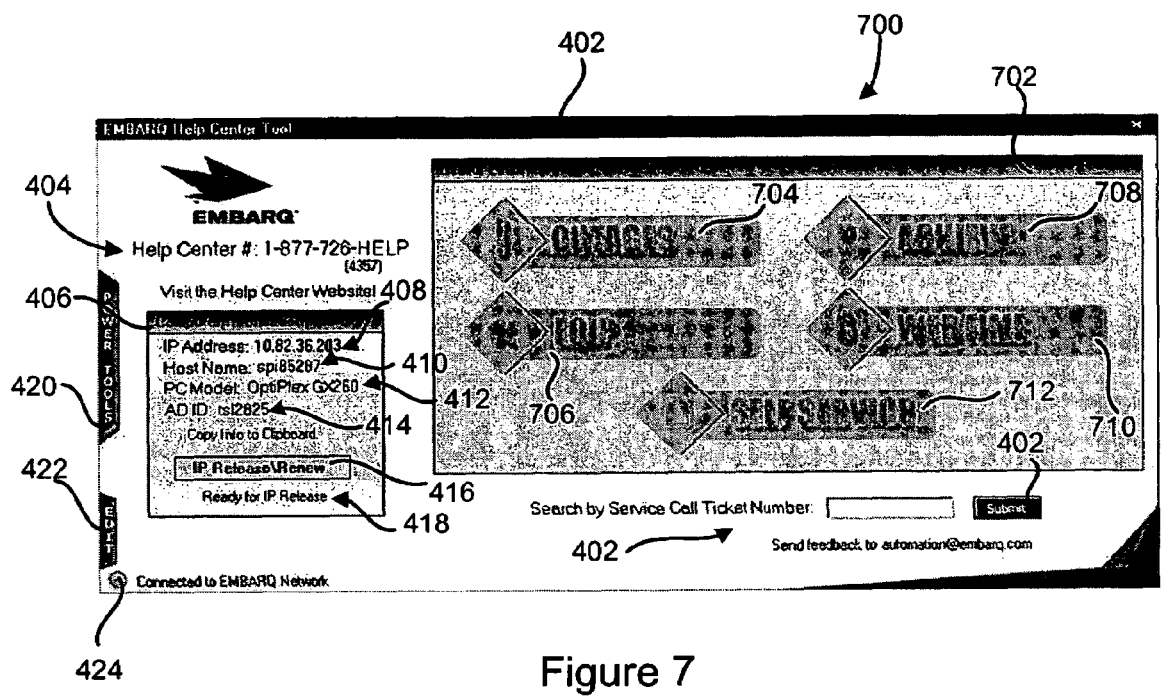
FIG. 7 illustrates another exemplary screenshot of a user interface of the present system showing a useful links window according to an embodiment of the present invention.

FIG. 7 illustrates an exemplary screenshot of an embodiment 700 of a user interface of the present system showing a useful links window 702 of the present invention. The useful links window 702 may be presented to a user as a tab next to the outage information window 426 as would be understood by those skilled in the art. When the outages button 704 is selected, it will open a new web browser that directs the user to the official outage website. When the EQIP button 706 is selected, it will connect the user to the company's local intranet. When the ACHIEVE button 708 is selected, it will display to the user the company's Performance Management Process. When selected by a user, the WEBTIME button 710 will display the company's internal Time Entry System. When selected by a user, the SELF SERVICE button 712 will display the company's internal self-help knowledge base.

Figure 8:
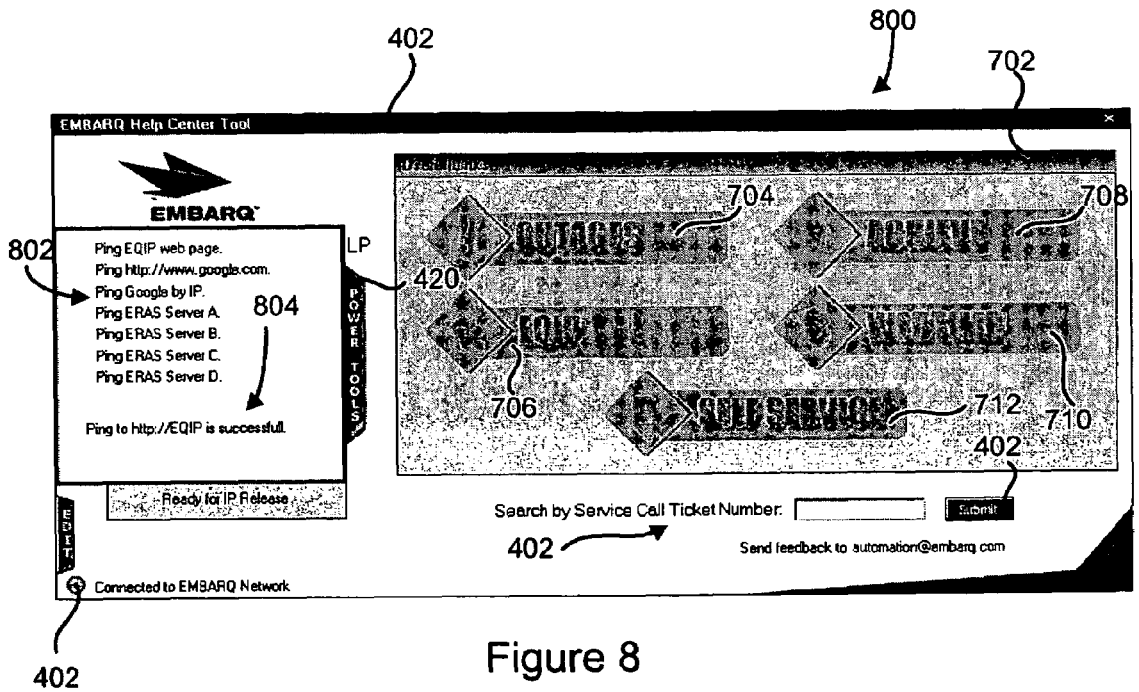
FIG. 8 illustrates another exemplary screenshot of a user interface of the present system showing a useful links window and a tools window according to an embodiment of the present invention.
Figure 9:
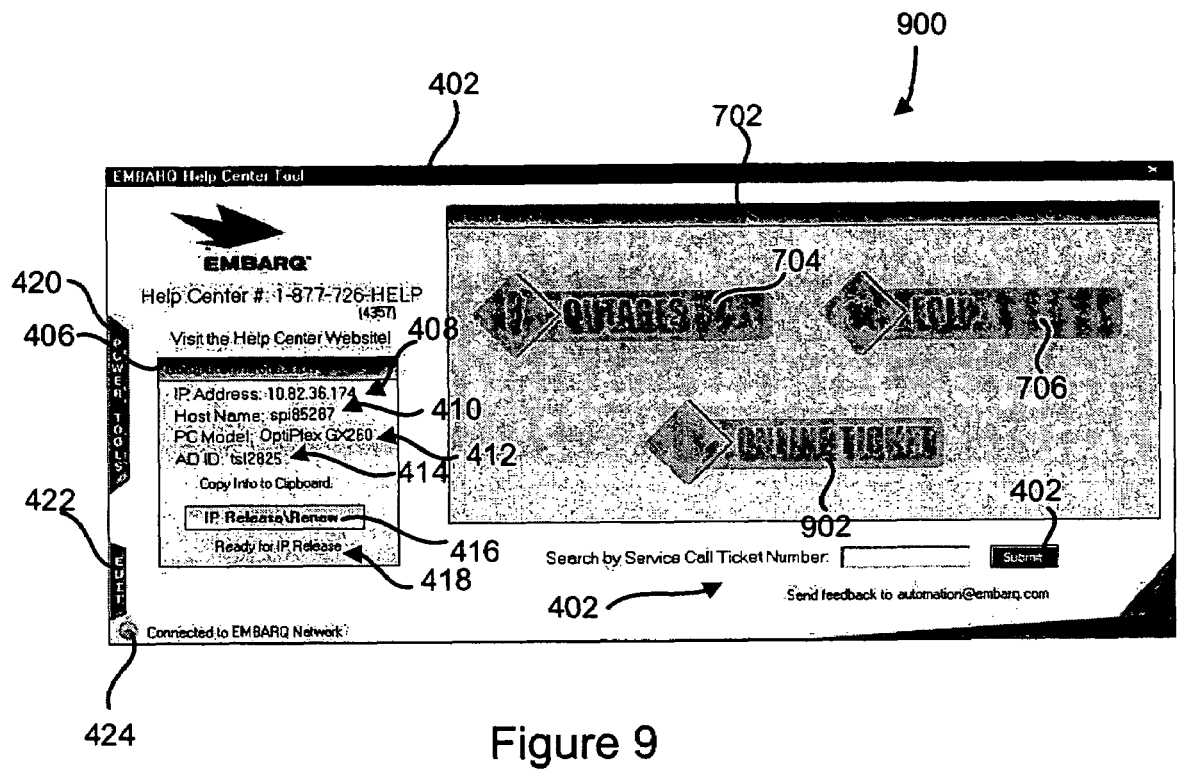
FIG. 9 illustrates another exemplary screenshot of a user interface of the present system showing a useful links window and a tools window according to another embodiment of the present invention.

FIG. 8 illustrates an exemplary screenshot of an embodiment 800 of a user interface of the present system showing a useful links window 702 and a power tools menu 420 of the present invention. When the power tools menu 420 is selected, the window opens up as shown in FIG. 8 to display a list of networks 802 to ping. These options to ping a desired network further provide to a user additional troubleshooting tools. For example, if a user is working remotely, such as from their home, and they select the "Ping EQIP web page" link the system may return a message 804 such as "unsuccessful" if they are not connected to the company's intranet. Additionally, if the user selects the "Ping http://www.google.com" link and the system returns a message 804 "successful," then the user knows that they have a network connection to the Internet. As another example, if a user selects the "Ping http://www.google.com" and the system returns a message 804 "unsuccessful" but they select "Ping Google by IP" and it is successful, then the user knows that there exists a problem with their DNS. Further, the ERAS servers may be pinged to further provide additional troubleshooting information to a user. Upon pinging the ERAS servers a user can tell, based upon the results of the ping, if they are able to connect remotely to the company's network. If the ping result is "successful" the user should be able to connect with no issues. If the ping result is "unsuccessful" the user would know that they will not be able to connect to the company's network and further troubleshooting must be performed. Additionally, over the phone a help desk person may direct a user to proceed through these selections and report the associated messages to further enhance the troubleshooting abilities of the system. FIG. 9 illustrates an exemplary screenshot of an embodiment 900 of a user interface of the present system showing a useful links window 702 and a power tools menu 420 of the present invention that further includes an ONLINE TICKET button 902. When selected by a user, the ONLINE TICKET button 902 will display the company's internal self-help knowledge base.

Figure 10:
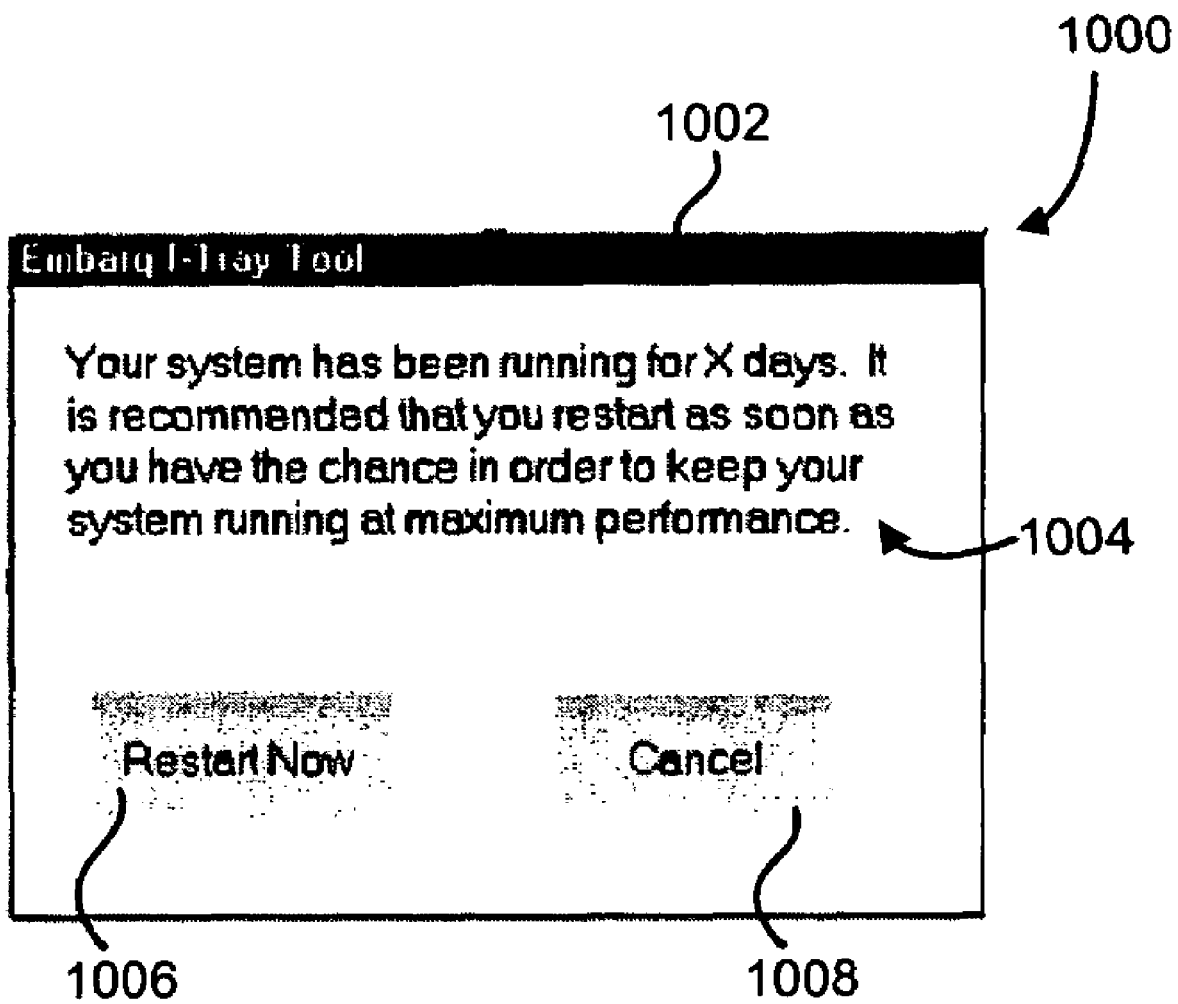
FIG. 10 illustrates another exemplary screenshot of a user interface of the present system showing a restart request window according to an embodiment of the present invention.

FIG. 10 illustrates an exemplary screenshot of an embodiment 1000 of a user interface of the present system showing a restart request window 1002 of the present invention. The restart request window 1002 includes a message 1004 that notifies a user that they have not restarted their computer 204a-204n, 206a-206n, 208a-208n, and 210a-210n within a predetermined period of time, such as 3 days. The message 1004 may further prompt the user to turn off or restart their computer in order to release tied up memory of the user's computer 204a-204n, 206a-206n, 208a-208n, and 210a-210n, which improves the performance of the user's computer 204a-204n, 206a-206n, 208a-208n, and 210a-210n. The restart request window 1002 further includes a restart button 1006 and a cancel button 1008. If the restart button 1006 is selected, the user's computer 204a-204n, 206a-206n, 208a-208n, and 210a-210n will shutdown and then restart. If the cancel button 1008 is selected, then the message 1004 will close. The present system will check the system timer on the computer to determine when it was last restarted. When the three day maximum has been reached it will display the restart request window 1002 in a pop-up box form on the users display.

Another aspect of the present system is that it detects the screen resolution setting of a user's computer 204a-204n, 206a-206n, 208a-208n, and 210a-210n and adjusts the amount of information displayed to a user for convenience. For example, if the system detects that a particular user's screen resolution was 800*600, then they system may only present approximately one-third of the information to the user.

Figure 11:
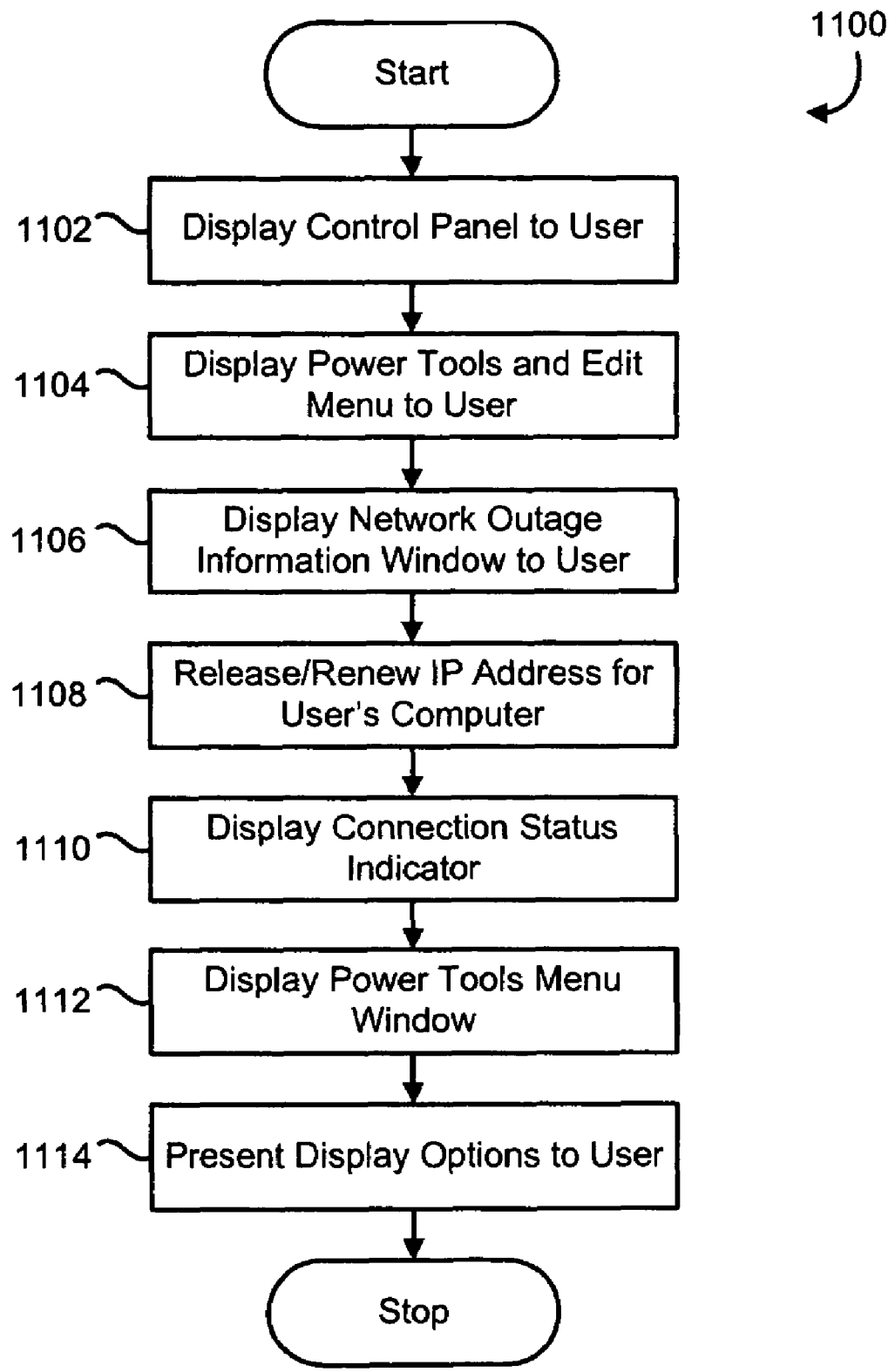
FIG. 11 illustrates a block diagram of an exemplary process for providing network connectivity and computer status information according to an embodiment of the present invention.

FIG. 11 illustrates a block diagram of an embodiment 1100 of an exemplary process for providing network connectivity and computer status information according to an embodiment of the present invention. In step 1102, the system displays the control panel 402 to a user's computer display. The control panel 402 may be displayed upon starting the user's computer 204a-204n, 206a-206n, 208a-208n, and 210a-210n or by selecting the icon 302 on their toolbar 304. Step 1102 includes displaying a help center telephone number 404 that may be called by a user. In addition, step 1102 further includes displaying a user's computer's IP address 408, host name 410, PC model 412, user ID 414, IP release/renew button 416, and IP release status 418 to the user. In step 1104, the system displays a power tools menu 420, an edit menu 422, and a connection status indicator 424 to the user.

In step 1106, the system displays an outage information window 426 that displays network connectivity service call 428 regarding the networks available to a user's computer 204a-204n, 206a-206n, 208a-208n, and 210a-210n. In step 1108, an IP release/renew button 416 is displayed to a user for selecting to release and renew the IP address for the user's computer 204a-204n, 206a-206n, 208a-208n, and 210a-210n. In step 1110, the system displays a connection status indicator 424 to the user indicating the network that the user's computer 204a-204n, 206a-206n, 208a-208n, and 210a-210n is connected. In step 1112, the system displays a power tools menu 420 to the user, which displays selections for pinging a selection of servers. In step 1114, the system further displays an edit menu window that presents a selection of options to the user for how they wish to have the system displayed.

Although there has been described what is at present considered to be the preferred embodiments of the system and method for providing network connectivity and computer status information, it will be understood that the system can be embodied in other specific forms without departing from the spirit or essential characteristics thereof. For example, servers, other than those described herein, could be used without departing from the spirit or essential characteristics of the system and method for providing network connectivity and computer status information. The present embodiments are, therefore, to be considered in all aspects as illustrative and not restrictive. The scope of the system and method for providing network connectivity and computer status information is indicated by the appended claim rather than the foregoing description.

What is claimed:

1. A method for providing network connectivity and computer status information of a user's computer comprising:
   - determining, by a server to which the user's computer is in communication, IP address, host name, computer model, and user ID of the user's computer;
   - determining, by the server, a telephone number to a help desk associated with said user's computer;
   - displaying by the user's computer the telephone number and the IP address, host name, computer model, and user ID of the user's computer to the user;
   - determining, by the server, outages of servers relating to the user's computer;
   - displaying the outages of the servers to the user, the outages are updated periodically at a predetermined period, the outages include one or more links associated with network issues or outages; and
   - pushing updates of the telephone number to a plurality of computers including the user's computer from the server in response to determining that an event that affects a network on which the computers are operating is about to occur.

2. The method of claim 1 further comprising:
   - displaying an IP release to the user;
   - responsive to selecting the IP release by the user, automatically releasing an IP address of the user's computer and retrieving a new IP address for the user's computer; and
   - displaying an IP release status indicator to the user.

3. The method of claim 1, further comprising displaying an indicator, and wherein the indicator is a dedicated icon displayable on a toolbar of the user's computer, and wherein selecting the dedicated icon opens a control panel including a plurality of sections including a computer information window including the telephone number and the computer's IP address, host name, computer model, and user ID of the user's computer, a power tools menu, an edit menu, and a connection status indicator, and an outage information window.

4. The method of claim 1 further comprising:
   - determining, by the server, a network connection status for the user's computer; and
   - displaying the network connection status to the user.

5. The method of claim 1 further comprising:
   - providing a list of servers available to the user's computer;
   - responsive to selecting one of the list of servers, pinging the selected server to determine if the user's computer is connected to the-selected server; and
   - displaying a result of said pinging to the user.

6. The method of claim 1 further comprising:
   - determining, by the server, if the user's computer has exceeded a predetermined period of time without being restarted; and
   - sending, by the server, to the user's computer a message to restart the user's computer if the user's computer has exceeded a predetermined connection time.

7. The method of claim 1 further comprising:
   - determining, by the server, the resolution setting of the user's computer; and
   - adjusting the display of the telephone number and the computer's IP address, host name, computer model, and user ID of the user's computer to the user.

8. The method according to claim 1, further comprising:
   - providing a text entry field on the same display as the telephone number and the computer's IP address, host name, computer model, and user ID of the user's computer to enable the user to enter a service call ticket number;
   - in response to receiving the service call ticket number, searching for information associated with the service call ticket number; and
   - in response to locating the service call ticket number information, displaying the service call ticket number information for the user to view.

9. The method according to claim 1, further comprising displaying a connection status indicator in one of a plurality of different colors indicative of connection status of the user's computer.

10. The method according to claim 1, further comprising:
determining whether the user's computer has obtained an IP address, and if not, setting color of a connection status indicator to a first color, otherwise,
determining whether the IP address of the user's computer is on a network of a company network, and if so, setting the color of the connection status indicator to a second color, otherwise,
determining whether the IP address of the user's computer is not on a company network, and if so, setting the color of the connection status indicator to a third color.

11. The method according to claim 1, further comprising:
detecting a screen resolution setting of the user's computer; and
adjusting the amount of information displayed to a user based on the screen resolution setting.

12. The method according to claim 1, wherein determining that an event that affects the network includes determining that the event is an unplanned event.

13. A system for providing network connectivity and computer status information of a user's computer comprising:
means for determining an IP address, host name, computer model, and user ID of the user's computer;
means for determining a telephone number to a help desk associated, with the user's computer;
means for displaying the telephone number and the computer's IP address, host name, computer model, and user ID of said user's computer to the user;
means for determining, by the server, outages of servers relating to the user's computer;
means for displaying the outages of the servers to the user, the outages being updated periodically at a predetermined period, the outages include one or more links associated with network issues or outages; and
means for pushing updates of the telephone number to a plurality of computers including the user's computer from the server in response to determining that an event that affects a network on which the computers are operating is about to occur.

14. The system of claim 13 further comprising:
means for displaying an IP release to the user; and
responsive to selecting the IP release by the user, means for automatically releasing an IP address of the user's computer and retrieving a new IP address for the user's computer.

15. The system of claim 13 further comprising:
means for displaying an IP release status indicator to the user, wherein the indicator is a dedicated icon displayable on a toolbar of the user's computer, and wherein selecting the dedicated icon opens a control panel displaying network connectivity information and computer status information.

16. The system of claim 13 further comprising:
means for providing a list of servers available to the user's computer;
responsive to selecting one of the list of servers, means for pinging the selected server to determine if the user's computer is connected to the selected server; and
means for displaying a result of the pinging to the user.

17. The system of claim 13 further comprising:
means for determining if the user's computer has exceeded a predetermined period of time without being restarted; and
means for sending the user's computer a message to restart the user's computer if the user's computer has exceeded a predetermined connection time.

18. The system of claim 13 further comprising:
means for determining the resolution setting of the user's computer; and
means for adjusting the display of the telephone number and the computer's IP address, host name, computer model, and user ID of the user's computer to the user.

19. An electronic system for providing network connectivity and computer status information of a user's computer comprising:
an electronic input device for producing input signals;
a display;
an electronic memory storing a help desk telephone number, IP address, host name, computer model, and user ID of the user's computer; and
an electronic processor communicating with said memory and said display and responsive to the input signals to:
direct said display to display the help desk telephone number, computer's IP address, host name, computer model, and user ID of the user's computer;
determine outages of servers relating to the user's computer;
display the outages of the servers to the user, the outages being updated periodically at a predetermined period, the outages include one or more links associated with network issues or outages;
receive an update of the telephone number in response to determining that an event that affects a network on which the user's computer is operating is about to occur; and
direct said display to display the updated telephone number.

20. The system as in claim 19 wherein the electronic processor is further responsive to the input signals to:
display an IP release to the user; and
responsive to selecting the IP release by the user, automatically releasing IP address of the user's computer and retrieving a new IP address for the user's computer.

21. The system as in claim 19 wherein the electronic input device produces input signals in response to selection of an indicator, and wherein the electronic processor is further responsive to the input signals to display the IP release status, wherein the indicator is a dedicated icon displayable on a toolbar of the user's computer, and wherein selecting the dedicated icon opens a control panel displaying network connectivity information and computer status information.

22. The system as in claim 19 wherein the electronic processor is further responsive to the input signals to:
determine a network connection status for the user's computer; and
display the network connection status to the user.

23. The system as in claim 19 wherein the electronic processor is further responsive to input signals to:
provide a list of servers available to the user's computer;
responsive to selecting one of the list of servers, ping the selected server to determine if the user's computer is connected to the selected server; and
display a result of said ping to the user.

24. The system as in claim 19 wherein the electronic processor is further responsive to input signals to:
determine if the user's computer has exceeded a predetermined period of time without being restarted; and send the user's computer a message to restart the user's computer if the user's computer has exceeded a predetermined connection time.

25. The system as in claim 19 wherein the electronic processor is further responsive to input signals to:
   determine the resolution setting of the user's computer; and
   adjust the display of the telephone number and the computer's IP address, host name, computer model, and user ID of the user's computer to the user.

26. The system of claim 13 further comprising:
   means for determining a network connection status for the user's computer; and
   means for displaying the network connection status to the user.

27. The system as in claim 19, wherein determining that an event that affects the network includes determining that the event is an unplanned event.

* * * * *